United States Patent
Ganapathiappan et al.

(10) Patent No.: US 8,916,334 B2
(45) Date of Patent: Dec. 23, 2014

(54) MICRO-COMPOSITE MATERIAL FOR THREE-DIMENSIONAL PRINTING

(71) Applicant: Hewlett-Packard Development Company, L.P., Fort Collins, CO (US)

(72) Inventors: Sivapackia Ganapathiappan, Los Altos, CA (US); Krzysztof Nauka, Palo Alto, CA (US); Hou T. Ng, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/752,303

(22) Filed: Jan. 28, 2013

(65) Prior Publication Data

US 2014/0212532 A1 Jul. 31, 2014

(51) Int. Cl.
  *G03F 7/004* (2006.01)
  *G03F 7/027* (2006.01)
  *G03F 7/031* (2006.01)

(52) U.S. Cl.
  USPC ............... 430/281.1; 430/285.1; 430/905

(58) Field of Classification Search
  USPC ................... 430/281.1, 285.1, 905
  See application file for complete search history.

(56) References Cited

U.S. PATENT DOCUMENTS

| | | | |
|---|---|---|---|
| 5,330,882 A | 7/1994 | Kawaguchi et al. | |
| 5,393,637 A | 2/1995 | Kanda et al. | |
| 7,431,879 B2 * | 10/2008 | Kasai et al. | 264/460 |
| 7,550,518 B2 | 6/2009 | Bredt et al. | |
| 7,569,328 B2 | 8/2009 | Fujimaki | |
| 7,674,423 B2 * | 3/2010 | Sano | 264/463 |
| 2010/0022676 A1 | 1/2010 | Rogers et al. | |
| 2012/0213976 A1 | 8/2012 | Xu et al. | |

* cited by examiner

*Primary Examiner* — Amanda C. Walke
(74) *Attorney, Agent, or Firm* — Thorpe, North & Western L.L.P.; Gary P. Oakeson

(57) ABSTRACT

The present disclosure provides a micro-composite material used in the fabrication of three-dimensional objects, and associated methods and systems. In one example, a micro-composite material used in the fabrication of a three-dimensional object can comprise micronized polymeric particles; a photocurable curing agent; and a dye present in the micro-composite material in an amount at from 0.0001 wt % to 0.1 wt %, the dye having a $\lambda$max between 350 nm and 800 nm.

11 Claims, 4 Drawing Sheets

---

202 — identifying a light source for curing the micro-composite material

204 — preparing micro-composite material by admixing micronized polymeric particles, a photocurable curing agent that is photocurable using the light source, and from 0.0001 wt% to 0.1 wt% of a dye having a $\lambda$max within 50 nm of light emittable from the light source First (bottom) layer Top layer First (bottom) layer Top layer

MICRO-COMPOSITE MATERIAL FOR THREE-DIMENSIONAL PRINTING

BACKGROUND

Printing technologies can be used to create three-dimensional objects from data output of a computerized modeling source. For example, one can design a three-dimensional object using a computer program, and the computer can output the data of the design to a printing system capable of forming the solid three-dimensional object. More specifically, solid free-form fabrication (or layer manufacturing) can be defined generally as a fabrication technology used to build a three-dimensional object using layer by layer or point-by-point fabrication. With this fabrication process, complex shapes can be formed without the use of a pre-shaped die or mold.

Essentially, with such a system, an object can be designed using a computer program, such as a Computer Aided Design (CAD) application. Once the object has been designed three-dimensionally, solid free-form fabrication technology enables the translation of the computer-generated model into a three-dimensional object. This technology is useful in areas such as verifying a CAD model, evaluating design feasibility, testing part functionality, assessing aesthetics, checking ergonomics of design, aiding in tool and fixture design, creating conceptual models and sales/marketing tools, generating patterns for investment casting, reducing or eliminating engineering changes in production, prototyping, and providing production runs, to name a few.

In this evolving area of technology, there has been a desire to provide new materials and methods of manufacture that are relatively easy to employ, provide rigid structures, and are relatively quick in their formation. Thus, additional methods, systems, and/or compositions that meet these criteria would be an advancement in the art.

BRIEF DESCRIPTION OF THE DRAWINGS

Additional features and advantages of the disclosure will be apparent from the detailed description which follows, taken in conjunction with the accompanying drawings, which together illustrate, by way of example, features of the disclosure.

Figure 1:
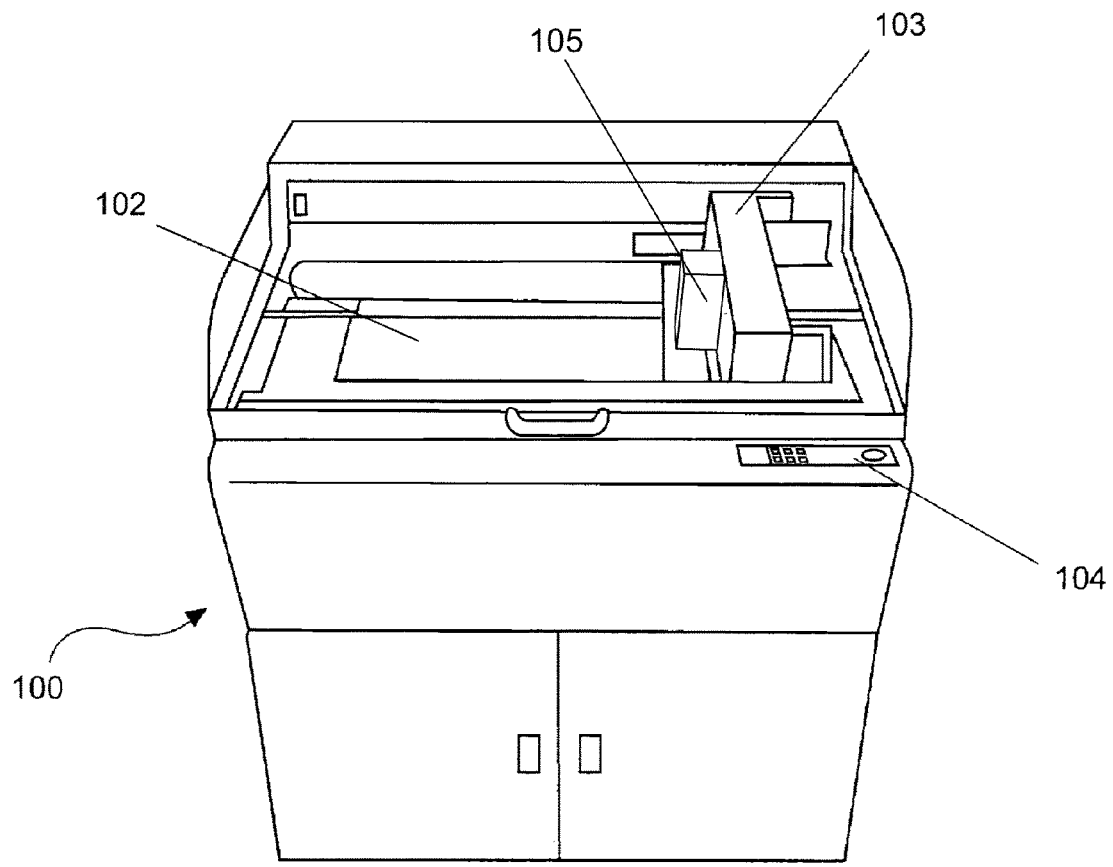
FIG. 1 depicts a 3D printer in accordance with an example of the present disclosure.

Reference will now be made to the exemplary embodiments illustrated, and specific language will be used herein to describe the same. It will nevertheless be understood that no limitation of the scope of the disclosure is thereby intended.

DETAILED DESCRIPTION

In one type of solid free-form fabrication, a dispensing system such as an ink-jet dispensing system, and optionally, a curing or hardening system, are used to dispense liquid build material for forming three-dimensional objects, as well as support material for supporting the build material as it hardens. Thus, the dispensed liquid of the build material is hardened or cured to form the object.

It has been recognized that 3D printed objects can achieve excellent edge acuity by addition of a small amount of a dye in the printed composition while maintaining the mechanical properties associated with photocurable materials. In accordance with this, compositions, methods, and systems are directed to the incorporation and use of a dye where the dye can absorb scattered photons within a building composition providing the benefits discussed herein. It is noted that when discussing the present micro-composite material, methods, and systems, each of these discussions can be considered applicable to each of these examples, whether or not they are explicitly discussed in the context of that example. Thus, for example, in discussing a dye in a micro-composite material, such a dye can also be used in a method of making a 3D object, and vice versa.

Generally, 3D printing involves the use of micronized particles to vary mechanical properties of the final 3D printed objects. However, it has been recognized that the use of micronized particles, even particles in the nanometer range, scatter light used in the photocuring process. As such, the edge acuity of the 3D printed object is greatly affected. In consideration of this issue, it has been discovered, as described herein, that the addition of a small amount of dye having an absorption spectrum matched to the wavelength of the light used in the photocuring composition can absorb the scattered photons and provide excellent edge acuity of the printed object while maintaining desirable mechanical properties including tensile strength, elongation at break, dimensional stability and heat deflection. Thus, the dye is not added for the purpose of coloring the object, but rather to absorb scattered light so that the edge acuity of the materials can be maintained.

During this process, specific areas are exposed to an energy source (such as light) which corresponds to a particular layer of the 3D object. Hence, the precision of the lateral curing plays a role in the final dimensional accuracy of the object. However, edge bleeding during curing can deteriorate such dimensional accuracy as a result of light scattering in the presence of micronized particles.

With the above in mind, a micro-composite material used in the fabrication of a three-dimensional object can comprise micronized photocurable polymeric particles, a curing agent, and a dye. The dye can be present in the micro-composite material in an amount at from 0.0001 wt % to 0.1 wt %, and the dye can have a λmax of 350 nm to 800 nm. As discussed herein, wt % refers to the weight of the component divided the total weight of the material and can be considered wt/wt %. As discussed herein, the dye is matched to the energy source that cures the materials such that the scattered photons from the energy source are absorbed by the dye. Further, the dye is present in an amount sufficient for absorption of the scattered photons but that does not substantially impact the mechanical properties of the cured composition.

Generally, the micronized photocurable polymeric particles can comprise polyacrylates, polymethacrylates, polystyrenes, acrylonitrile butadiene styrenes, polyamides, polycarbonates, polyvinyls, polyurethanes, copolymers thereof, or combinations thereof. Of course, the present list is not limiting as the polymer particles can include any such photocurable polymers that are capable of providing acceptable mechanical properties to the finished 3D object. Additionally, the micronized photocurable polymer particles have a particle size of less than 1 millimeter. In one example, the particle size can be less than 1 micron. Further, the micronized photocurable polymeric particles can have a weight average molecular weight from 20,000 Mw to 1,000,000 Mw.

Generally, a curing agent can be used to cure the layers of 3D material. In one example, the curing agent can be photocurable. Typically, the curing agent can be a cross-linker. In one aspect, the cross-linker can include divinylbenzene, ethylene glycol dimethacrylate, diethylene glycol dimethacrylate, triethylene glycol dimethacrylate, cyclohexanedimethanol divinyl ether, 1,6-hexanediol diacrylate, divinyl adipate, trimethylolpropane triacrylate, pentaerythritol tri- and tetra(meth)acrylate, or mixtures thereof. Additionally, curing can be initiated by a photoinitiator. In one example, the photoinitiator can include one or more of Genocure® CQ (available from Rahn USA Corp.), H-Nu 470, 535 and 635, and/or H-Nu Blue 640 and 660 (available from Spectra Group Limited Inc.).

Generally, as discussed herein, the dye is matched to the wavelength of energy used to cure the composition. In one example, the dye can be an azo dye or any compounds that absorb the light in the desired region. For example, the dye can be Disperse Black 9 (λmax of 461 nm) or Disperse Orange 25 (λmax of 457 nm) having the structures:

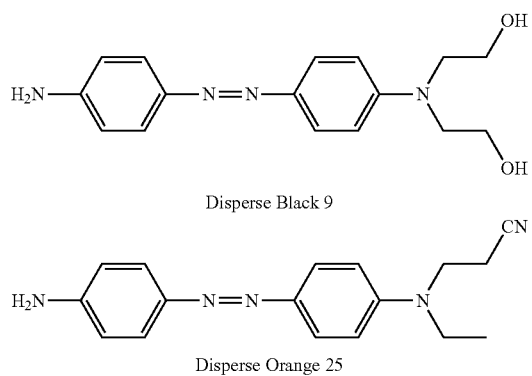

Disperse Black 9

Disperse Orange 25

The dye is generally present in a low amount, sufficient to absorb scattered photons during curing, but not impacting the desired mechanical properties of the finished 3D object. In one example, the dye can be present in the micro-composite material in an amount at from 0.0001 wt % to 0.1 wt %. In one aspect, the dye can be present in an amount from 0.01 wt % to 0.1 wt %. In one specific aspect, the dye can be present in an amount from 0.025 wt % to 0.1 wt %, or even, 0.05 wt % to 0.1 wt %. Regarding absorption, the dye is generally matched to the energy source used for curing. In one example, the dye can have a λmax from 350 nm to 800 nm. In another aspect, the dye can have a λmax from 420 nm to 520 nm. In one specific example, the λmax of the dye can be within 50 nm of the wavelength of energy used to cure the composition. In another aspect, the λmax can be within 20 nm. As used herein, "λmax" refers to the maximum wavelength absorbed by the dye. In one aspect, "λmax" can refer to the maximum wavelength absorbed by the dye between the wavelengths of 350 nm and 800 nm. As used herein, "between" when referring to a range is inclusive of the endpoints, e.g., between 350 nm and 800 nm includes both 350 nm and 800 nm end points within the range. The presently described dyes may also impart color, although other colorants (dyes or pigments) may also be used to impart color to the final 3D object. Typically, dyes used to impart color would be used at higher concentrations than the present dyes for absorbing scattered photons.

As discussed herein, the matching of the absorption of the dye to the wavelength of the energy source has provided unexpected edge acuity for cured 3D objects. In one example, such edge acuity can be measured by the amount of edge bleeding on the cured object (excess material after curing extending beyond the boundaries of the uncured object). In some aspects, the cured micro-composite material can have an edge bleeding of 3 mm or less, or even 2 mm or less. In other aspects, the edge bleeding can be 1 mm or less. In one aspect, the edge bleeding can be 0.5 mm or less, and, in one specific aspect, can be 0.1 mm or less. In some examples, effectively 0 mm edge acuity can even be achieved. Such improvement in edge acuity can allow for the present technology to be used in precision applications, e.g., dental applications.

In one example, a device for fabricating a three-dimensional object can comprise an ejector for ejecting the micro-composite material, the micro-composite material including any of those as described herein; a light source for curing the micro-composite material; and a light source controller to cause the light source to emit light within 50 nm of the λmax. In one example, the micro-composite material can be loaded in the device, such as in a cartridge or other container, and can be configured to be ejected on demand from the ejector. Thus, referring to FIG. 1, a 3D object is typically built by a layering process using a 3D printer. The 3D printer generally comprises a fabrication bin 102, a moveable platform 103 for dispensing the micro-composite material, and a display panel 104. The present 3D printer can further comprise a light source 105. The moveable platform can contain the ejector for dispensing the micro-composite material, and the light source can include a light source controller.

Figure 2:
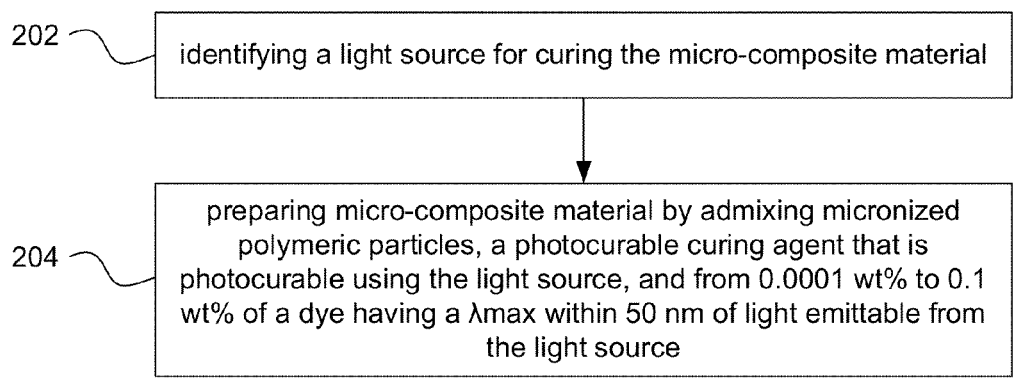
FIG. 2 is a flow chart depicting a method in accordance with an example of the present disclosure.

The present micro-composite materials can likewise be manufactured to be used with 3D printing techniques. In one example as shown in FIG. 2, a method of manufacturing a micro-composite material can comprise identifying 202 a light source for curing the micro-composite material; and preparing 204 micro-composite material by admixing micronized polymeric particles, a photocurable curing agent that is photocurable using the light source, and from 0.0001 wt % to 0.1 wt % of a dye having a λmax within 50 nm of light emittable from the light source. In this example, the light source can be identified based on the dye and photocurable material selected, or the dye and photocurable material can be selected based on the light source selected.

As an example of how to build a three dimensional object according to the principles described herein, such building can include depositing a micro-composite material in a defined region, the micro-composite material including micronized polymeric particles, a photocurable curing agent, and a dye. Additional steps can also be carried out, including curing the micro-composite material with a light source emitting light at a wavelength within 50 nm of a λmax of the dye, and repeating the depositing and curing steps such that multiple layers of the micro-composite material are formed that are bound to one another. Additionally, steps of removing a portion of the micro-composite material that does not cure can also be carried out. The by repeating these steps at various times, a 3D object can be built accordingly.

It is to be understood that this disclosure is not limited to the particular process steps and materials disclosed herein because such process steps and materials may vary somewhat. It is also to be understood that the terminology used herein is used for the purpose of describing particular Examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3.5, and 4 and sub-ranges such as from 1-3, from 2-4, and from 3-5, etc. Additionally, a numerical range with a lower end of "0" can include a sub-range using "0.1" as the lower end point.

EXAMPLES

The following examples illustrate embodiments of the compositions, methods and systems that are presently known. However, it is to be understood that the following are only exemplary or illustrative of the application of the principles of the present disclosure. Numerous modifications and alternative compositions, methods, and systems may be devised by those skilled in the art without departing from the spirit and scope of the present compositions, methods, and systems. The appended claims are intended to cover such modifications and arrangements. Thus, while the present disclosure has been set forth with particularity, the following examples provide further detail in connection with what are presently deemed to be the acceptable examples.

Example 1

Comparable 3D Photocurable Object

Figure 3A:
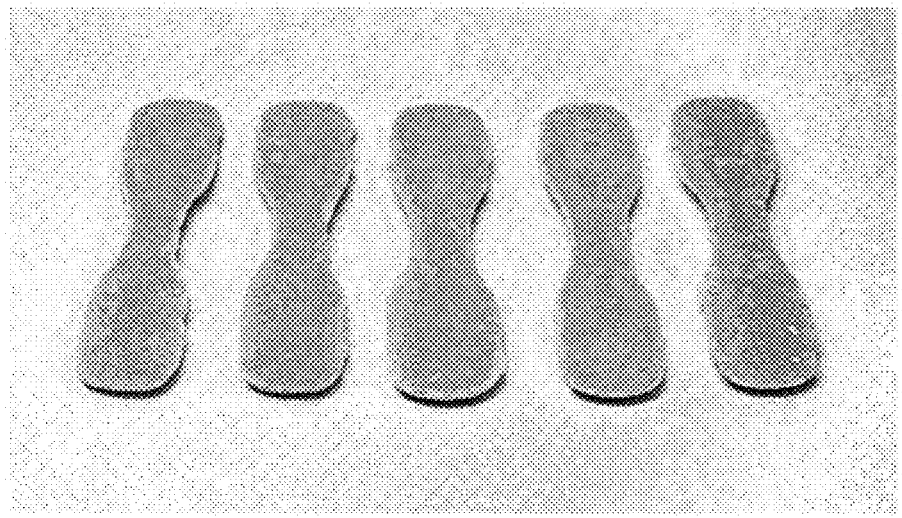
FIGS. 3A and 3B are photographs of a 3D printed object (bottom layer A, top layer B) in accordance with a comparative example of the present disclosure.
Figure 3B:
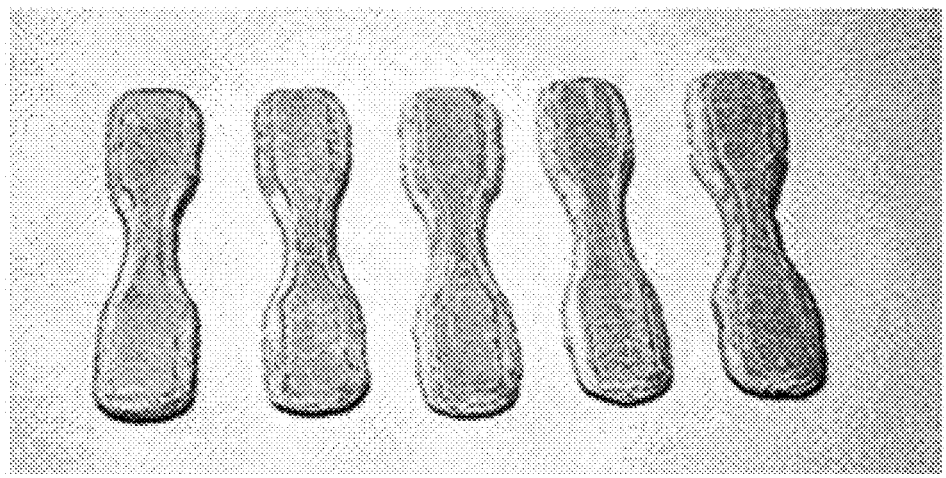

Six polyethylene based commercial resins (PE) having a particle size of 6 to 200 μm were obtained. In this Example 1, PE of 6 μm (17 g) was mixed with triethylene glycol dimethacrylate (TEG) (17 g) (having 1.5% of photoinitiator Genocure® CQ and catalyst Genocure® EHA obtained from RAHN USA). The composition was mixed thoroughly in a SpeedMixer™ (model DAC 150 FVZ) 5 times for 1 min each and a 1 min interval for cooling. The mixture was applied to a substrate as a thin layer and the thickness was adjusted by doctorblade coating process with a thickness of 200 microns. Then, a shadow mask of dogbones type V was placed just above this coating, where the material was exposed to 470 nm blue light (Light source Z760 model was obtained from Qubit system at 70% of power) for 1 minute. The above procedure was repeated for another 14 layers, generating a total thickness of about 3 mm. A curing spread (edge bleeding) of 3.5 mm was observed, as shown in FIGS. 3A and 3B.

Example 2

Comparable 3D Photocurable Object

Figure 4A:
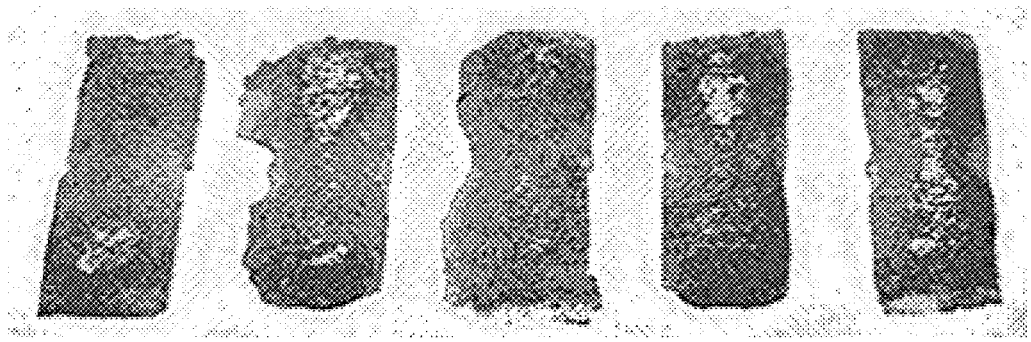
FIGS. 4A and 4B are photographs of a 3D printed object (bottom layer A, top layer B) in accordance with another comparative example of the present disclosure.
Figure 4B:
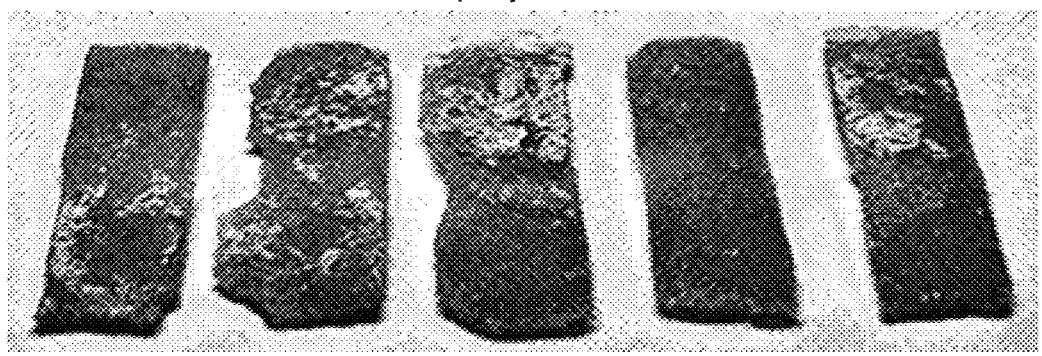

The same materials were used as in Example 1, except PE was replaced by latex particle of size 250 nm using the same ingredients but having about 35% of latex particle. The dogbones were fabricated under similar conditions. A curing spread of 5.5 mm was observed, as shown in FIGS. 4A and 4B.

Example 3

3D Photocurable Object

The same materials were used as in Example 1, except the particle size of the PE was 35 μm and disperse black 9 (8.5 mg) was added along with TEG. The dogbones were fabricated under similar conditions. A curing spread of 2 mm was observed. Notably, the curing spread was significantly reduced by adding the disperse black 9, a dye having a λmax of 461 nm matched to the curing light source having a wavelength of 470 nm (blue light).

Example 4

3D Photocurable Object

The same materials were used as in Example 1, except disperse black 9 (17 mg) was added along with TEG. The dogbones were fabricated under similar conditions. A curing spread of 0 mm was observed Example 5

3D Photocurable Object

Figure 5A:
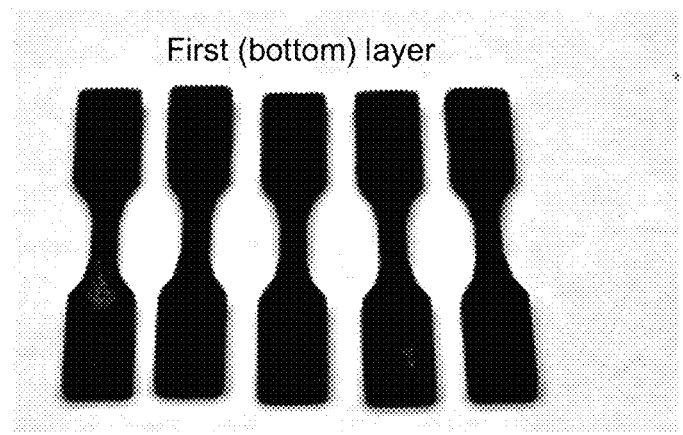
FIGS. 5A and 5B are photographs of a 3D printed object (bottom layer A, top layer B) in accordance with an example of the present disclosure.
Figure 5B:
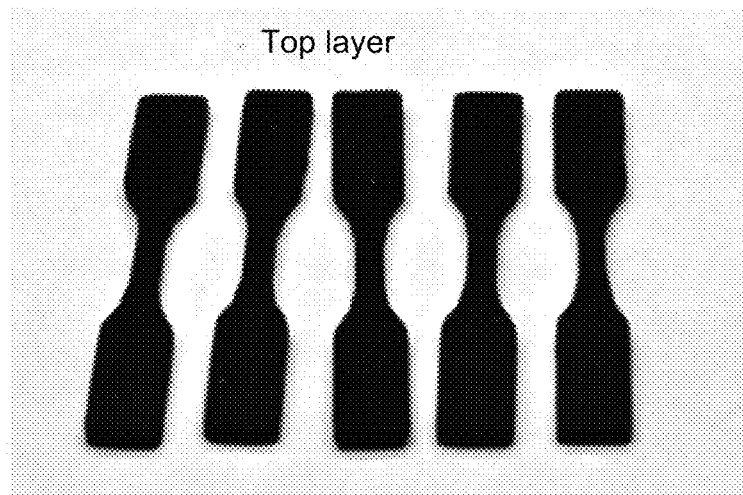

The same materials were used as in Example 1, except disperse black 9 (34 mg) was added along with TEG. The dogbones were fabricated under similar conditions. A curing spread of 0 mm was observed as illustrated in FIGS. 5A and 5B.

While the disclosure has been described with reference to certain examples, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. A micro-composite material for three-dimensional printing, comprising:
   micronized polymeric particles;
   a dye present in the micro-composite material in an amount from 0.0001 wt % to 0.1 wt %, the dye having a λmax from 350 nm to 800 nm; and a photocurable curing agent that is curable by light at a wavelength within 50 nm of the λmax of the dye.

2. The micro-composite material of claim 1, wherein the micronized polymeric particles comprise a polymer individually selected from the group of polyacrylates, polymethacrylates, polystyrenes, acrylonitrile butadiene styrenes, polyamides, polycarbonates, polyvinyls, polyesters, polyurethanes, copolymers thereof, and mixtures thereof.

3. The micro-composite material of claim 1, wherein the photocurable curing agent is a cross-linker selected from the group of divinylbenzene, ethylene glycol dimethacrylate, triethlyene glycol dimethacrylate, cyclohexanedimethanol divinyl ether, 1,6-hexanediol diacrylate, divinyl adipate, trimethylolpropane triacrylate, and mixtures thereof.

4. The micro-composite material of claim 1, wherein the dye is an azo dye.

5. The micro-composite material of claim 1, wherein the dye is present in the micro-composite material in an amount at from 0.01 wt % to 0.1 wt %.

6. The micro-composite material of claim 1, wherein the λmax is from 420 nm to 520 nm.

7. The micro-composite material of claim 1, wherein the micronized polymeric particles have a particle size of less than 1 micron.

8. A method of manufacturing a micro-composite material used for three-dimensional printing, comprising:

identifying a light source for curing the micro-composite material; and preparing micro-composite material by admixing micronized polymeric particles, a photocurable curing agent that is photocurable using the light source, and from 0.0001 wt % to 0.1 wt % of a dye having a λmax within 50 nm of light emittable from the light source from 350 nm to 800 nm; and curing the photocurable curing agent in the micro-composite material using the light source, wherein light from the light source has a wavelength within 50 nm of the λmax of the dye.

9. The method of claim 8, wherein the micronized polymeric particles comprise a polymer individually selected from the group of polyacrylates, polymethacrylates, polystyrenes, acrylonitrile butadiene styrenes, polyamides, polycarbonates, polyvinyls, polyesters, polyurethanes, copolymers thereof, and mixtures thereof.

10. The method of claim 8, wherein the dye is an azo dye and is present in the micro-composite material in an amount from 0.01 wt % to 0.1 wt %.

11. The micro-composite material of claim 1, wherein the photocurable curing agent is curable by light at a wavelength within 20 nm of the λmax of the dye.

* * * * *

UNITED STATES PATENT AND TRADEMARK OFFICE
CERTIFICATE OF CORRECTION

PATENT NO. : 8,916,334 B2
APPLICATION NO. : 13/752303
DATED : December 23, 2014
INVENTOR(S) : Sivapackia Ganapathiappan et al.

It is certified that error appears in the above-identified patent and that said Letters Patent is hereby corrected as shown below:

In the Specification

In column 7, lines 11-12, in Claim 3, delete "triethlyene" and insert -- triethylene --, therefor.

Signed and Sealed this
Nineteenth Day of May, 2015

Michelle K. Lee
*Director of the United States Patent and Trademark Office*